United States Patent [19]

Skorupinski

[11] 3,927,330

[45] Dec. 16, 1975

[54] WATER POWER MACHINE AND UNDER SEA, UNDER WATER GENERATOR STATION

[76] Inventor: Roy E. Skorupinski, 6402 Jim, Houston, Tex. 77018

[22] Filed: Apr. 29, 1974

[21] Appl. No.: 464,961

[52] U.S. Cl. ................................ 290/54; 415/5
[51] Int. Cl.[2] .................. F03B 13/00; E02B 9/08
[58] Field of Search ......... 418/4, 145; 416/7; 415/5; 198/137, 193, 184; 290/52, 53, 54, 42, 45, 50

[56] References Cited
UNITED STATES PATENTS

| | | | |
|---|---|---|---|
| 855,164 | 5/1907 | Couture | 415/5 |
| 979,320 | 12/1910 | Johnson | 415/5 |
| 1,131,680 | 3/1915 | Cooke | 415/5 |
| 1,148,074 | 7/1915 | Britt | 415/5 |
| 1,855,425 | 4/1932 | Sorenson | 416/7 |
| 1,958,843 | 5/1934 | Brown | 418/4 |
| 2,315,027 | 3/1943 | Suenson | 416/7 |

FOREIGN PATENTS OR APPLICATIONS

| | | | |
|---|---|---|---|
| 313,850 | 6/1956 | Switzerland | 290/43 |

*Primary Examiner*—James R. Scott
*Assistant Examiner*—John W. Redman
*Attorney, Agent, or Firm*—Donald Gunn

[57] ABSTRACT

This apparatus relates to a device which converts water flow into electrical power. It is particularly adapted to be installed totally submerged in a body of water or at offshore locations. It intercepts tidal flow, oceanic currents and the like to generate power. It includes a framework enabling the apparatus to be installed on the bottom of a body of water. It incorporates a plurality of adjustable guide louvers which are positioned to direct a stream in a particular manner. The louvers cooperate with a generally flat transverse plate which extends fully across the equipment. The plate cooperates with the louvers to direct the stream of water to a point intercepting the set of buckets carried on a conveyor. The buckets are not of ordinary construction as found on water wheels, but are especially constructed to erect when intercepting water flow, which causes them to fill, and to collapse on a return passage. They are mounted on a conveyor belt which travels in endless fashion. The collapsing of the buckets on the return passage reduces water flow resistance and forces them to dump the water. The buckets are defined by transverse pivotable plates which have guide wheels which engage a set of guide rails at the outer end.

20 Claims, 5 Drawing Figures

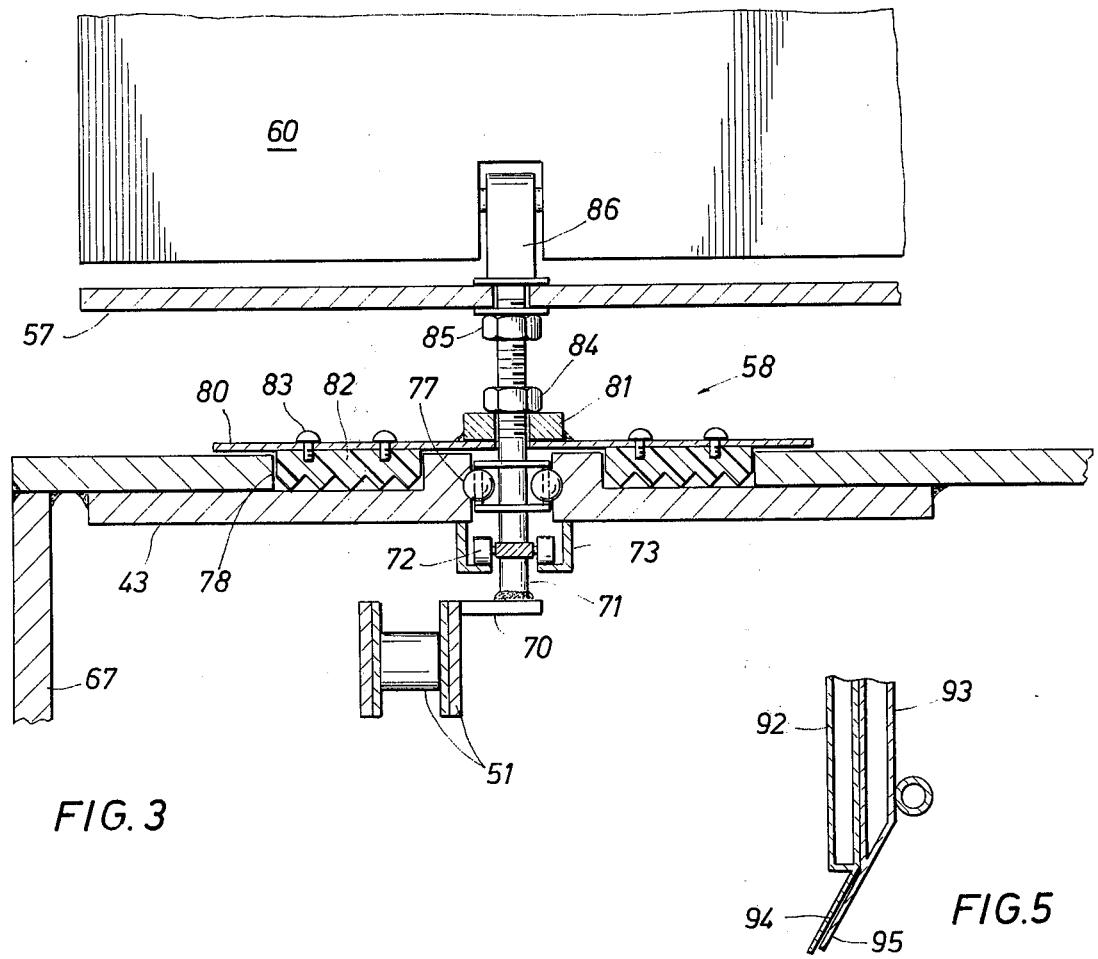
FIG. 3
FIG. 5
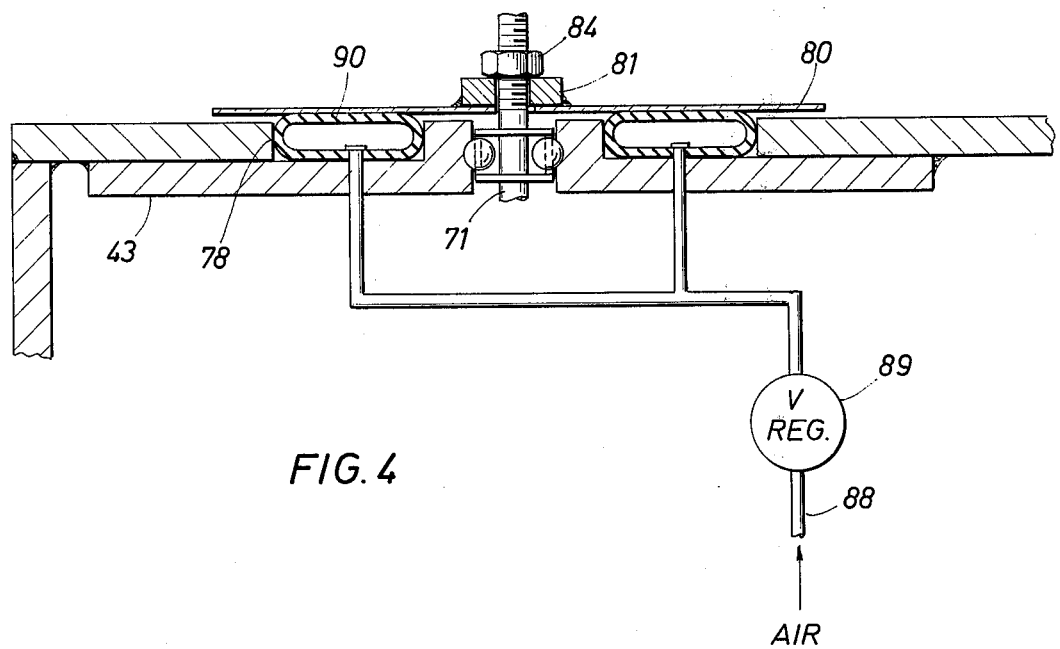
FIG. 4

WATER POWER MACHINE AND UNDER SEA, UNDER WATER GENERATOR STATION

BACKGROUND OF THE INVENTION

Current flow in oceanic bodies is sometimes very predictable. The apparatus of the present invention is a mechanical apparatus which converts such current flows into electrical power. It is particularly adapted to be used with current flows many miles at sea. For example, tidal flows between small islands, through inlets, and the like, can be harnessed for electrical power. Regularly flowing streams far out at sea can be harnessed. The present invention relates to, but is a marked improvement over, the ancient water wheel which harnessed flow in a small stream. Such devices as the ancient water wheel normally incorporated a structure which mounted a wheel where buckets on the wheel would pick up the current flow. The apparatus of the present invention differs in that it is adapted to be entirely submerged. Full submersion is not required, but is possible. The water wheel encountered minimum resistance with the stream because the buckets and a portion of the wheel disengage the water flow. An overshot water wheel contemplates return of the wheel and the buckets by disengaging the stream. The present invention differs in that it disengages the stream by dumping the buckets mounted on the conveyor and streamlining them so that they can still remain under water. It is not necessary to remove them from the body of water. The apparatus of the present invention is able to be installed fully under water. It can be raised or lowered to be partly under water. This provides greater flexibility to enable it to capture streams which may fluctuate, which may run on the surface, or which run below the surface of a body of water. The apparatus generates electric current by harnessing water flow in a stream, the stream being the flow of established currents or tidal flows.

PRIOR ART

United States Patents:

| | | |
|---|---|---|
| 3,730,643 | 2,548,615 | 2,379,314 |
| 1,908,429 | 1,799,439 | 1,645,486 |
| 2,346,595 | 1,707,795 | 1,587,071 |
| 2,403,178 | 1,667,634 | 3,604,942 |
| 1,625,896 | | |

SUMMARY OF THE INVENTION

The present invention is an apparatus which intercepts a tidal flow or established stream in a larger body of water. The apparatus includes a framework supported on a foundation which is sunk on the bottom of the body of water. The framework includes a number of upright members which support a conveyor belt. The conveyor belt preferably travels between two rollers and has a main or exposed straight run along the length of the apparatus and a return run. The first run carries a number of buckets which are deployed to intercept the current flow. The buckets are not the buckets traditionally carried on a water wheel, but rather are constructed out of a number of pivotally mounted plates which have rollers on the end which engage guide rails which cause the plates to deploy at an extended position, thereby opening a chamber. The chamber is adapted to be filled with water. The chambers in the buckets dump water at the end of the first run and are pivotally constructed and arranged to collapse. The extendable platelike members which extend outwardly from the conveyor swing back against the conveyor to substantially reduce the volume of the chambers and cause the extended plates to lay flat against the conveyor as the conveyor travels along the return path. The conveyor is equipped with buckets at all points along its length and the buckets all are adapted to intercept water when turned against the current flow. The current flow is directed into the buckets by a set of louvers which are pivotally mounted to direct water flow toward the chambers in the bucket. The louvers pivotally rotate as a unit to vary the angle of attack. The louvers cooperate with a transverse spaced plate extending through the apparatus which is pivoted to direct current flow through the louvers toward the buckets. Each bucket is defined by pivotally mounted extendible plates which carries a set of rollers on the outer end which engage a guide rail. The rollers are adapted to control the angle of the plates, thereby defining the capacity of the chambers in the buckets.

The conveyor is connected to a link chain which is engaged with end rollers. The end rollers provide a power source which is taken off by a drive shaft connected to the end rollers to guide the conveyor and the power or drive shaft connects with an electromechanical converter such as an alternator. The alternator provides electrical power. The control apparatus includes a mechanism for adjusting the louvers and angle of the transverse plate.

DESCRIPTION OF THE DRAWINGS

FIG. 3 is an enlarged sectional view of a means for transferring motion to the conveyor chain while also pivotally supporting the plates which define buckets in the conveyor system;

FIG. 4 shows an alternative view to the structure of FIG. 3; and,

FIG. 5 is a sectional view through ballast tanks, taken along the line 5 — 5 of FIG. 2.

DESCRIPTION OF THE PREFERRED EMBODIMENT

Figure 1:
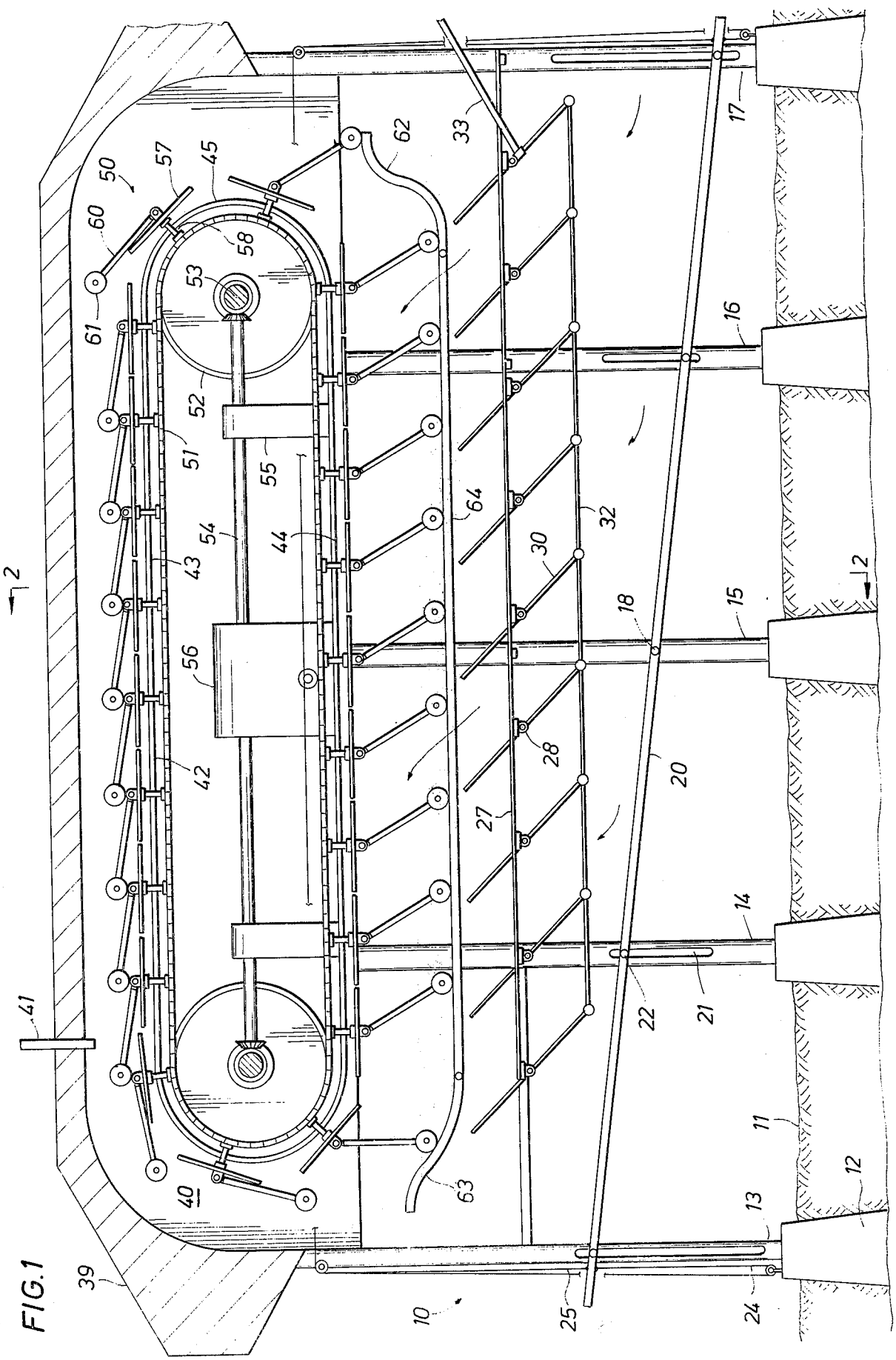
FIG. 1 is a side view of the apparatus of the present invention installed totally submerged to intercept an underwater tidal flow, illustrating details of construction of the supporting framework and the conveyor system which includes a plurality of buckets.
Figure 2:
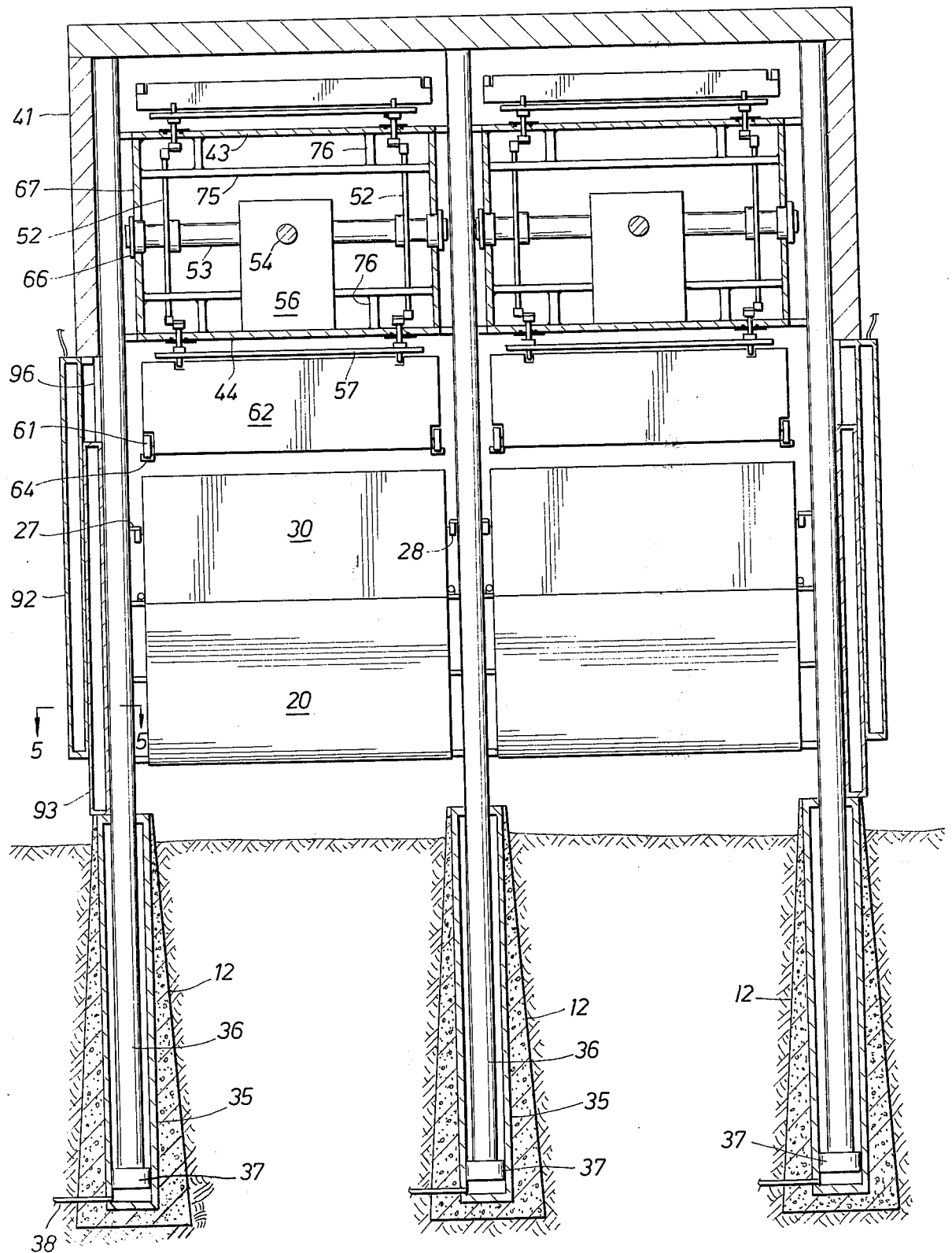
FIG. 2 is a sectional view along the line 2 — 2 of FIG. 1 showing apparatus for selectively raising the framework by use of hydraulically operated cylinders, and particularly disclosing details of construction of the conveyor and the paddles which are supported thereon.

In FIG. 1, the electric generating apparatus 10 is adapted to be fully submerged in a body of water to intercept a flowing stream in that body of water. It is supported on the bottom 11 by the foundations 12 which are preferably formed of concrete and sunk in the bottom. The foundation footings or pilings support upstanding frame members 13, 14, 15, 16 and 17. The precise number is variable, but the preferred embodiment preferably incorporates an odd number of pilings along the length of the apparatus. Across the width of the apparatus, the number of pilings can be varied. Three pilings are included across the width, as shown in FIG. 2, but this number can be varied.

The center piling 15 has a hinged pivot where a transverse shaft 18 supports a generally horizontal deflector plate 20. The deflector plate 20 extends across the width of the apparatus and has a length which approximates the length of several pilings. The deflector plate 20 has a set of projecting lugs along each edge which extend outwardly and engage the frame members 13 – 17. For instance, the frame member 14 has a slot 21 which has a vertical dimension enabling the lug 22 to extend into the slot to guide the plate 20. The lug 22 preferably fits loosely in the slot 21 which is wider than the lug to accomodate the arcuate movement of the lug 22 as it pivots around the mounting shaft 18. The shaft 18 serves as a pivot point for the deflector plate 20 which rotates about a generally horizontal axis through the equipment. The lug 22 is accomodated in the slot 21. The slot 21 has a vertical extent which limits excursion of the lug 22. This enables the deflector plate to be rested in a perfectly horizontal position to be canted in the manner illustrated in FIG. 1 to deflect the flow of water upwardly. The deflector plate 20 incorporates a protruding lug which preferably engages a matching slot in the adjacent frame members which are arranged along each side of the deflector plate 20. The deflector plate 20 is rotated about its central axis 18 by cables which are connected to it.

At the left-hand end of FIG. 1, a cable 24 extends downwardly past the deflector plate 20 and circles around a pulley and connects to the lower side of the deflector plate. The cable 24 preferably extends along the column 13 and passes by the edge of the plate 20. It preferably doubles back and connects to the lower edge of the plate 20. A second cable 25 connects to the top edge of the plate 20. The cables 24 and 25 are alternately pulled to vary the location of the plate with respect to the pivot. A similar cabling arrangement is incorporated at the opposite end parallel to the column 17 and works the opposite end. The cable system provides an adequate means of control for the plate 20 which is deflected to an angle forcing water flow through the framework upwardly for purposes to be described. The cables extend into a chamber to be described.

A generally horizontal frame member 27 extends horizontally along the columns which support it. The frame member 27 is duplicated at both sides of the equipment. It supports a pivot 28 located on its lower side which pivotally engages a protruding lug on a transverse louver 30. The louver 30 extends fully across the equipment and has a width approximately equal to the deflector plate 20. The louver 30 is duplicated at multiple locations. The several louvers are all similar in construction and are all pivotally mounted in like manner. They are all joined along lower corners by a connector rod 32 which keeps all of the louvers parallel to one another. They are adapted to move about the pivot mounting 28. The rod 32 causes them to move in unison. The several louvers 30 are swung to an angle which tends to direct water upwardly toward the conveyor. The several louvers move as a group and cooperate to direct water flow generally from the horizontal upwardly at an angle for purposes to be described.

A lever 33 is preferably connected to one of the louvers to set it at the desired angle and the connecting rod 32 which joins the other louvers causes all of them to move as a unit. The lever 33 is controlled by cables similar to the cables 24 and 25 described above which are rigged at the end of the frame.

The deflector plate 20 and several louvers all aid in directing water upwardly. The water flow is directed upwardly to drive a conveyor as will be described. The upward flow is dispersed along the length of the equipment, and the water flow through the louvers can be picked up and turned upwardly. It impinges broadly on the conveyor and causes it to rotate.

The frame members shown in FIG. 1 are shown in better detail in FIG. 2. The frame members all extend downwardly into the concrete footings 12. Considering only one for purposes of description, the frame member shown at the left side of FIG. 2 extends downwardly into a closed hydraulic chamber 35. The hydraulic chamber 35 is closed at the bottom and open at the top only to enable the frame member extending thereabove to function somewhat sa a piston rod. The lower end 36 connects to a piston 37 which is hydraulically forced upwardly by fluid pressure introduced at the lower end of the cylinder 35. Fluid introduced at the lower end is supplied through lines extending around the footing at 38. The hydraulic line connects with a source (of typical construction in a chamber to be described) which preferably connects in parallel with all of the similarly arranged hydraulic cylinders in the other footings to force the apparatus supported on the piston rod 36 upwardly so that the entire equipment is raised evenly. It is not necessary to make the hydraulic cylinder double acting because the weight which bears downwardly on the hydraulic fluid below the piston 37 serves as a return mechanism. The piston 37 is thus raised and returned by its own weight. The piston 37 has a length of travel which is sufficient to raise the structure over the specified range.

The apparatus of the present invention is particularly adapted to be installed at an offshore location. It can be fully submerged to pick up a oceanic stream flowing at any depth in the water. It can be installed below the surface to intercept an established current flow. This enables the equipment to be positioned at the proper depth to be in the center of the stream, thereby operating more efficiently. Occasionally it will be necessary to service the equipment, and might be helpful to raise the equipment above the surface of the water. The equipment can then be raised on the hydraulically operated piston and cylinder arrangement shown in the drawings to a point where the upper portions are above the water. It might also be helpful to lower the equipment in the water. If it is installed right at the surface under ordinary operating conditions, it may be helpful to lower it to the bottom in the event a storm passes through the near vicinity. Lowering the apparatus deeper in the water is a safety maneuver which protects the equipment from harm and damage. The vertical travel may be relatively short or quite substantial, perhaps as much as fifty or seventy-five feet. A single stage, single acting hydraulic cylinder has been shown. However, multiple stage hydraulic cylinders are available and can be used in lieu of those illustrated. They function in the same manner and respond to hydraulic fluid under pressure. Additional fluid under pressure will provide more extension of the apparatus. Preferably the piston rod 36 extends upwardly and connects to upper portions of the vertical frame members shown in FIG. 1 and may even be constructed of the same stock.

Returning to FIG. 1, the frame members 13 – 17 extend upwardly to a weighted or concrete housing 39 which covers the apparatus. It is weighted, and can be formed of concrete. It includes an internal chamber 40 which is apt to trap air therein, and a vent pipe 41 is incorporated to vent air to atmosphere so that the interior can fill with water. It is helpful to maintain all of the equipment fully submerged rather than partly submerged and partly in the air trapped in the chamber 40 to reduce corrosion which normally occurs with salt water exposure in air.

The housing 39 is supported on the several frame members. It has a length exceeding that of the equipment and is wider than the equipment also. The housing is defined by facing lengthwise side walls 41 shown in FIG. 2. The side walls 41 enable the equipment to support and receive the structure which will be described. The side walls 41 support an oval shaped chamber which is defined by an oval shaped partition 42. The partition 42 thus spans the full width of the equipment. It is comprised of a generally horizontal upper plate 43 shown in FIG. 1 and a parallel lower plate 44. At each end, the plates 43 and 44 smoothly curve into a semi-circular plate 45 which is duplicated at both ends.

The chamber 42 provides a sealed interior for equipment which will be noted. It extends the width of the apparatus and approximately the full length. Some clearance is left at the ends for a surrounding conveyor system to operate.

The apparatus of the present invention is used to generate power by providing a conveyor system which is powered by water flow carried upwardly by a deflector plate 20 through the louvers 30. The conveyor system 50 includes a chain conveyor 51 located on the interior of the chamber or housing 42. The chain 51 extends from end to end and extends around a cog gear 52 which is preferably duplicated at each end. In actuality, the chain 52 is duplicated for the conveyor as will be seen in viewing FIG. 2. The gear 52 is supported on a shaft 53 which connects through a set of bevelled gears with a drive shaft 54 extending the length of the housing. The drive shaft is supported and held in position by a pillow block 55. The gear 52 is duplicated on the opposite side of the equipment as shown in FIG. 2. The conveyor system travels on two chains which are coterminous and parallel to one another.

The shaft 54 extends to an integrally constructed gear box and alternator set 56. The alternator converts mechanical power into electrical power. More will be noted concerning this hereinafter.

The chain 51 cooperates with a conveyor which forms a multiplicity of individual buckets which are canted by dividing walls to catch water flow. This is accomplished wherein each bucket or chamber is defined by partitions which separate adjacent chambers. The right hand side of FIG. 1 shows one set of apparatus which is duplicated on each side so as to construct a system which forms a multiplicity of buckets at the right or opportune moment which gather water flow at the right moment, but collapse to dump the flow and stramline to enable the conveyor system to readily return each bucket. At the right hand side of FIG. 1, a plate 57 is mounted on an upstanding member 58. The plate defines the width of an individual bucket. However, one half of the plate 57 is actually in one isolated bucket and the other half is in an adjacent bucket. The upright member 58 includes a pivot and supports a transverse paddle plate 60. The plate 60 is pivotally mounted and can swing through slightly more than 180°. It is pivotal to swing through about 200° of arc. At the right hand end of the conveyor, the paddle plate 60 is laid over against the plate 57. It defines a minimal volume and is streamlined so that it does not catch any water flow. The paddle plate 60 hangs limp, but is postured in the position shown in FIG. 1 by cooperative equipment to be described. The conveyor rotates clockwise and the plate 60 will eventually swing about its pivot and fall downwardly or in advance as shown by FIG. 1. The paddle plate 60 carries two rollers 61, one at each outer corner. The paddle plate 60 tips over and the roller 61 lands on a portion of a guide rail 62 which is curved so that the plate 60 is arrested momentarily. This enables the conveyor to carry the plate 57 further around the gear 52 in clockwise rotation and thereby causes the paddle plate 60 to trail behind. The roller 61 causes the paddle plate to lag behind, and by so doing, defines a chamber erected in individual buckets which is erected at the right instant and subsequently collapsed.

The paddle plate 60 assumes a following position and maintains this position because its length is sufficiently great to keep it engaged with the full length of the guide rail. The guide rail is formed in three portions, the right end 62, central portion 64 and left end 63. The end portions are identical and are moved by a cable which raises and lowers them. They are connected to the central portion 64 by pivots and the leading end portion is raised upwardly to catch the paddles and delay them in their motion while the paddles finally disengage the entirety of the guide rail arrangement at the trailing end portion which dips downwardly to enable the paddles to fall away and move under control of gravity. With the conveyor running in the indicated direction in FIG. 1, the guide rail portions 62 and 63 are set as illustrated. They are reversed for rotation of the conveyor in the opposite direction. This will be detailed later in the description.

FIG. 2 incorporates additional details. The horizontal shaft 53 is shown extending between a pair of fixed hubs 66 which support the shaft 53. The hubs 66 are located outboard of the sprocket gears 52 and are supported by a transverse plate 67. The transverse plate 67 is anchored between the horizontal plates 43 and 44 which define a closed chamber. This places all of the moving equipment within the closed chamber as will be described hereinafter. The closed chamber 42 extends fully across the equipment with a center line defined by vertical frame members. They pass through and extend to the top of the housing 39. As desired, the frame members can be received in individual wells or interconnect with the chamber housing plate members 43 and 44. The chamber 42 can be isolated for each adjacent set of equipment or can be made continuous across the top of the equipment.

Attention is next directed to FIG. 3 which shows some of the apparatus which enables the conveyor system to travel along the length of the equipment adjacent to the closed chamber while communicating the movement of the conveyor system to a point on the interior. As will be recalled, the apparatus includes a chain 51 formed of individual links. At spaced locations along the chain, an individual link includes an L-shaped protruding bracket 70 mounted on the side which projects outwardly and positions a lateral tab. It is connected to an upstanding post 71 which is welded to it. The post 71 supports a set of rollers 72 at a specified height above the L-shaped member 70. The rollers 70 are mounted for free wheeling rotation on appropriately positioned shafts and the rollers 72 are received in a channel 73 which engages each roller. The channel 73 is affixed to the lower side of the plate 43 which is fixed or stationary in the equipment.

The plate 43 extends to the side plate 67. The plate 43 is actually divided along the path of the chain to define a slot. The slot is specified in width and divides the plate 43 in two portions which are held together by transverse braces 75 and vertical braces 76 better shown in FIG. 2. The braces 75 and 76 are arranged between the top plate 43 and bottom plate 44. They are located inside of the paths of the chains. The post 71 is limited in movement by the rollers 72 which are engaged with the interior surfaces of the channel 73. The post also mounts a ball bearing assembly 77 which engages facing raceways cut in the edge of the slot or in the two halves of the plate 43. The raceways extend along the slot and guide the ball bearing assembly 77 to prevent unwanted motion of the shaft 71. The constraint of the ball bearing assembly 77 along with that of the rollers 72 thus holds the chain in the desired location relative to the fixed apparatus.

The plate 43 is constructed with a lengthwise channel 78. The channel or slot 78 is parallel to the slot formed in the plate 43. In fabrication, it is achieved by constructing the plate 43 of two individual plates with the gap between the two defining the channel. Duplicate channels are located on each side of the slot. The channels provide a guideway to receive a water seal mechanism which incorporates a transverse plate 80 which fully spans both channels. It is drilled and mounts a welded reinforcing eyelet 81. The eyelet 81 reinforces the opening and enables the shaft 71 to extend upwardly and above the plate 80. The plate 80 supports a resiliently constructed seal member 82. The seal 82 has a width approximately equal to the channel 78 and extends fully into the channel. It is constructed and arranged to fill the entirety of the channel. It is shown with serrations along the bottom face to reduce frictional drag. A sealant, such as a heavy packing grease, is placed in the channel and fills the grooves of the serrated seal member 82. This sealant assists in expulsion of water. The sealant is maintained in a tacky state to expel water. Preferably a non-soluble sealant is used. The plate 80 encircles the housing 42. The plate 80 is formed in a generally oval shape, and is only slightly larger than the housing. It supports the seal strip 82 as it also encircles the housing. The plate 80 is thin and bends on such a large radius that creasing or fracture is not a problem. This is helpful in causing the equipment to encircle the oval shaped housing. The seal strip 82 is joined to the plate 80 periodically by means of rivets or bolts 83.

The shaft 71 extends above the plate 80. It is fixed in position by placing a lock nut 84 on the shaft. A similar lock nut 85 fixes the shaft 71 relative to the plate 57 which is spaced above the plate 80. The plate 57 has an opening enabling the shaft 71 to extend through the plate 57 and to a threaded pivot 86. The pivot 86 is constructed and arranaged like a cap which extends over the end of the shaft 71. It includes a transverse opening which enables it to receive a shaft therethrough to mount the paddle 60 for pivotal movement. The paddle 60 is supported by two of the pivot mounts shown in FIG. 3, one at each side. The paddle 60 thus swings about the axis of rotation defined by the pivot 86. This is the preferable arrangement although different hinging arrangements, such as a piano hinge, can be incorporated. It is preferable to provide a pivot shaft extending through the pivot 86 which connects with the paddle 60, thereby enabling rotation of the paddle.

The apparatus shown in FIG. 4 is an alternative form of the equipment. A pneumatic line 88 is supplied through a regulator valve 89 communicated with a resilient seal member 90. The seal member 90 is a closed rubber donut-shaped seal which is placed in the channel 78. At one or two locations, the line 88 is connected through the wall of the plate 43 and opens into the seal 90 to introduce air under pressure. The seal is inflated slightly to enable it to contact the plate 80. The plate 80 slides on the top side of the seal 90. A sheet gasket is preferably incorporated between the lock nut 84 and the reinforced eyelet 81 which supports it.

The pressure level maintained in the inflatable seal is subject to variation. If it is increased too greatly, it causes the seal to inflate to an excessive diameter and wear more rapidly. Minimal inflation is acceptable, but if the seal is too soft due to under inflation, it will not provide an adequate leak-proof seal.

The seal 90 can be aided in excluding water by pressurizing the chamber on the interior to a point equal to or exceeding the pressure of the water on the exterior. This is not an unreasonable pressure level because the apparatus is not normally required to operate at great depths. Water depths anywhere between ten and forty feet are considered within the normal range. The device will also work at greater depths to even one hundred fifty feet. It will also work at the surface. Other depths may be suggested, but it is believed that moderate depths are all that is required for most installations.

FIG. 5 shows a pair of adjacently arranged ballast tanks 92 and 93. They are guided relative to one another by means of attached angle plates 94 and 95. The angle plates are at each end of the ballast tanks to cause them to maintain a continual nesting arrangement.

The ballast tanks are shown in better view in FIG. 2. They are shown at the outer edge of the equipment. The tank 92 is preferably attached to the upper housing 39 which includes the side plate 41. This helps close off the side of the apparatus to lateral current flow and prevents the escape of the stream which flows through the equipment imparting mechanical energy to it. The ballast tank 92 is attached at its upper edge. If desired, it can be selectively detached such as by use of a cable system which connects to the plate 41 and selectively raises and lowers the ballast tank 92 relative to the plate 41. The plate 41 is effectively extended by the ballast tank 92 to prevent lateral flow of water.

The second ballast tank 93 is preferably located inboard. It is supported by a cable 96 which extends downwardly from the plate 41. This enables the entire apparatus to be elevated while the ballast tank 93 is held at a spaced depth relative to the upper housing. It slides downwardly relative to the outer ballast tank 92 to further close off the side of the equipment to lateral water flow patterns. In the event the housing is lowered substantially, two ballast tanks can assume a side-by-side relationship. In the event the housing is raised substantially above the height illustrated in FIG. 2, the side ballast tank 93 is preferably lowered relative to the ballast tank 92 to extend the lateral skirt around the apparatus. Both ballast tanks are preferably provided with a conduit which introduces air or water to selectively alter the bouyancy of the ballast tanks.

In operation, the power generating equipment of the present invention is particularly adapted to enable the conversion of inter-oceanic streams into electrical power. It is able to cooperate with streams which flow in the same direction and those which reverse, such as currents created by tides. The equipment is deployed so that it intercepts a stream or tidal flow. It is positioned at the appropriate height in the water to achieve this. The deflector plate 20 and louvers 30 are all set to specified angles to intercept the stream of water. The water flow impinges on the deflector plate and is diverted through the louvers to impinge on the conveyor system 50 at all points along its exposed length. The conveyor system is formed of a plurality of isolated buckets or chambers. Each intercepts water flow and creates a pushing force on the conveyor system which tends to rotate the conveyor system. As the buckets are assembled by the reorientation of the paddles 60, the buckets are then arranged to immediately intercept flow and convert the flow into a mechanical force imparted to the conveyor system for purposes of generating power. This force is not dissipated because the water cannot spill through the sides of the individual compartments or along the conveyor. As shown in FIG. 2, the paddle 60 is substantially wide and there is little space around the ends of the paddle for the water to spill outwardly. This is true in light of the fact that any water spilling around the end of any particular paddle must crowd into a relatively narrow passage and the flow of the stream which is intercepted by the conveyor is too substantial to be accomodated in such a small space in view of the incompressibility of water. As a consequence, the water is captured and the stream is converted into mechanical energy. The conveyor is dismantled at the end of the horizontal run. This is achieved by movement around the semicircular path at the end of the conveyor travel. The paddles 60 are no longer constrained by the rollers 61 mounted on their edge which disengage the guide rail 63. As a consequence, the water pressure impinging on that particular portion of a conveyor is dissipated and the stream flows freely onward out of the equipment.

Reversals of the direction of rotation are readily accomodated. The load is temporarily cut and the deflector 20 and the louvers 30 are repositioned to direct the current flow from the new direction upwardly into the conveyor. For instance, flow can be from the left of FIG. 1, not from the right. These alterations change movement of the conveyor in the opposite direction. This is achieved by setting the guide rail ends 62 and 63 in the reverse manner. This then kicks the paddle plates 60 to the opposite angle but the conveyor functions in exactly the same manner. The conveyor system thus tends to stall or stop moving when the current flow reverses direction. The guide rail ends are reset causing the first paddle wheel at the left hand end of FIG. 1 to intercept current flow and it moves the conveyor in the opposite direction. There will not be much power at this time, but the power will be sufficient to rotate the conveyor. The other paddle plates which are set at opposite angles do not impede movement because at this juncture they are set to intercept current flow from the first direction when it is coming from the opposite direction. After the second and third paddle plates follow the first, more torque is built up in the equipment and the conveyor moves around in the opposiite direction. This causes the paddle plates 60 to fall over in the opposite direction on the top of the conveyor from that shown in FIG. 1. They are pivoted so they can swing to both sides, and this is readily accomplished.

The chamber has room for control of the externally located equipment by hydraulic or cable manipulation. The cables and hydraulic lines which extend into the chamber are readily installed for easy use by human control.

The power generated by the apparatus is preferably controlled by use of a gear mechanism and governor associated with the alternator. The power is distributed by installing a conduit system through the side of the apparatus extending from the apparatus through the water to an on-shore location.

The foregoing is directed to the preferred embodiment of the present invention. The scope is determined by the appended claims.

I claim:

1. A power generator which comprises:
an endless conveyor;
a pair of spaced rollers supporting said conveyor for movement along a specified path between said rollers;
at least a pair of individually openable containers carried on said conveyor along the path and having an exposed face which intercepts flowing water to impart a water created force to said conveyor to cause it to move along the specified path;
said conveyor comprising
a set of plates located along its length;
hinged paddles extending outwardly at an angle relative to said plates to intercept current flow in water to create a force acting on said paddles, said plates and said paddles comprising said containers on said conveyor which are spaced lengthwise from one another on said conveyor;
an endless chain which engages said rollers and supports said containers;
an oval housing which encloses said chain and rollers therein;
a lengthwise slot in said housing adjacent to and parallel to the path of said chain;
container supports extending from said chain outwardly from said chain to support said containers;
an elongate flexible band overlying said slot and encircling said housing, said band slidably moving along and over said slot;
a groove adjacent to said slot on each side thereof;
a resilient elongate seal carried by said band sealing and slidably engaged with said grooves to exclude water from entry into said housing through said slot, said seal being located on one side of said band and said containers being on the opposite side of said band;
relatively fixed means for directly flowing water toward said conveyor to impinge on it at the portion extending along the specified path; and,
electric generator means in said housing connected to one of said rollers for generating electric power.

2. The apparatus of claim 1 including a supporting frame which is adapted to be fixedly rested on the bottom of a body of water and extend into the path of a current flow to support said conveyor and said rollers at a specified height above the bottom of the body of water.

3. The apparatus of claim 2 wherein said frame is fixedly anchored and is extendably operated to extend above the level of the body of water.

4. The apparatus of claim 3 including side walls extending along the path of said conveyor to prevent lateral escape of the current flow of water.

5. The apparatus of claim 4 wherein said fixed means includes a set of movable and fixable louvers which are arranged along a portion of the length of the path of said conveyor to provide a force acting on said conveyor along a portion of its length.

6. The apparatus of claim 5 including a surface means extending along a portion of said conveyor cooperative with said louvers and said surface means is movably mounted to direct water flow into said louvers.

7. The apparatus of claim 6 said surface means and said louvers are angularly movable to direct water flow impinging on said conveyor broadly to act on said containers as said conveyor moves along the path.

8. The apparatus of claim 1 including a guide means extending along and parallel to the path of said conveyor, and including a means on said paddle which engages said guide means to hold said paddle at a specified angle relative to said conveyor, and which further cooperate to release said paddle from its specified angle on completion of the movement of said container along said path.

9. The apparatus of claim 8 wherein said paddle is pulled along by said conveyor and by gravity falls away therefrom to the specified angle and wherein said guide means ends whereupon said paddle is free to move to a streamlined angle relative to said conveyor where it moves along a second path controlled by said rollers to enable an individual paddle to be repositioned for movement along the first path and wherein minimum force is imparted to said conveyor on the second path.

10. The apparatus of claim 8 including a similar beginning portion on said guide means which engages and frees said paddles to begin and end their movement at an angle of selected magnitude and wherein said portion is incorporated at opposite ends of said guide means.

11. The apparatus of claim 1 wherein said rollers are mounted on a shaft connected to said generating means.

12. The apparatus of claim 10 wherein said conveyor moves in either direction along the path between said rollers and said paddle is hinged to swing to the specified angle relative to said conveyor on movement in either direction.

13. The apparatus of claim 12 including a hinge pivoting said paddle through an angle of about 180°.

14. The apparatus of claim 1 wherein two consecutively arranged paddles on said conveyor define a first container and the next container is defined by one of the two and a third paddle.

15. For use in a device exposed to water to seal a moving part relative to a stationary part, a moving fluid seal to exclude entry of water past the seal into a stationary closed housing, comprising
- an elongate slot means in a housing which housing is adapted to be exposed to water;
- a member extending through said slot means in the housing;
- means for moving said member, said means being located on one side of the housing;
- a movable resilient seal means extending along said slot;
- a mating elongate fixed seal means adapted to be positioned parallel to said slot means and sealingly fixed relative thereto; and,
- first means for movably supporting said movable seal means in flexing and sliding sealing cooperative relationship to said fixed seal means, said first means moving said seal means along said fixed seal means and further moving at the same speed and direction along said slot means as said movable member, and wherein said movable means transfers motion from one side of the housing to the other.

16. The apparatus of claim 15 wherein said movable member is adapted to be connected to a powering device on one side of the housing and to a power requiring device on the other side.

17. The apparatus of claim 15 wherein said fixed seal means includes an elongate shoulder parallel to said slot means and said movable seal means includes an endless loop to move along said shoulder indefinitely.

18. The apparatus of claim 15 wherein said movable member is mounted to a drive chain in said housing and incorporates
- a protruding post;
- roller means positioning said post in said slot means; and,
- means for mounting said post on said movable seal means.

19. The apparatus of claim 18 wherein said post supports a first and second roller means for constrained movement of said post in two directions and permit movement along a third direction.

20. The apparatus of claim 19 wherein one roller means is received in a channel along said slot means and the second roller means has a width enabling it to fit in said slot means.

* * * * *